(12) United States Patent
Veeravasarapu et al.

(10) Patent No.: US 11,610,322 B2
(45) Date of Patent: Mar. 21, 2023

(54) COMPUTER VISION SYSTEMS AND METHODS FOR UNSUPERVISED LEARNING FOR PROGRESSIVELY ALIGNING NOISY CONTOURS

(71) Applicant: Insurance Services Office, Inc., Jersey City, NJ (US)

(72) Inventors: Venkata Subbarao Veeravasarapu, Munich (DE); Abhishek Goel, Delhi (IN); Deepak Mittal, Haryana (IN); Maneesh Kumar Singh, Princeton, NJ (US)

(73) Assignee: Insurance Services Office, Inc., Jersey City, NJ (US)

( * ) Notice: Subject to any disclaimer, the term of this patent is extended or adjusted under 35 U.S.C. 154(b) by 65 days.

(21) Appl. No.: 17/104,698

(22) Filed: Nov. 25, 2020

(65) Prior Publication Data

US 2021/0158549 A1    May 27, 2021

Related U.S. Application Data

(60) Provisional application No. 62/939,770, filed on Nov. 25, 2019.

(51) Int. Cl.
*G06T 7/33* (2017.01)
*G06N 3/08* (2006.01)
*G06T 3/00* (2006.01)
*G06N 3/088* (2023.01)

(52) U.S. Cl.
CPC ............ *G06T 7/337* (2017.01); *G06N 3/088* (2013.01); *G06T 3/0093* (2013.01); *G06T 2207/20016* (2013.01); *G06T 2207/20081* (2013.01); *G06T 2207/20084* (2013.01)

(58) Field of Classification Search
CPC .......... G06T 2207/20081; G06T 2207/20084; G06T 3/0006; G06T 3/0068–0081; G06T 3/0093; G06T 7/30–38; G06T 2207/20016; G06N 3/02–088
See application file for complete search history.

(56) References Cited

U.S. PATENT DOCUMENTS

2021/0142539 A1*    5/2021   Ayush .................. G06T 3/0093

OTHER PUBLICATIONS

Rocco, Ignacio, Relja Arandjelović, and Josef Sivic. "Convolutional Neural Network Architecture for Geometric Matching." IEEE Transactions on Pattern Analysis and Machine Intelligence 41.11 (2018): 2553-2567. (Year: 2018).*
Veeravasarapu, V. S. R., et al. "ProAlignNet: Unsupervised Learning for Progressively Aligning Noisy Contours." 2020 IEEE/CVF Conference on Computer Vision and Pattern Recognition (CVPR). IEEE, 2020. (Year: 2020).*

(Continued)

*Primary Examiner* — Geoffrey E Summers
(74) *Attorney, Agent, or Firm* — McCarter & English, LLP

(57) ABSTRACT

Computer vision systems and methods for noisy contour alignment are provided. The system generates a loss function and trains a convolutional neural network with the loss function and a plurality of images of a dataset to learn to align contours with progressively increasing complex forward and backward transforms over increasing scales. The system can align an attribute of an image of the dataset by the trained neural network.

20 Claims, 12 Drawing Sheets

(56) References Cited

OTHER PUBLICATIONS

Hanocka, Rana, et al. "ALIGNet: Partial-Shape Agnostic Alignment via Unsupervised Learning." arXiv preprint arXiv:1804.08497v2 (2018). (Year: 2018).*
Sun, Deqing, et al. "PWC-Net: CNNs for Optical Flow Using Pyramid, Warping, and Cost Volume."2018 IEEE/CVF Conference on Computer Vision and Pattern Recognition. IEEE, 2018. (Year: 2018).*
Wang, Yang, et al. "Occlusion Aware Unsupervised Learning of Optical Flow." 2018 IEEE/CVF Conference on Computer Vision and Pattern Recognition. IEEE, 2018. (Year: 2018).*
Acuna, et al., "Devil is in the Edges: Learning Semantic Boundaries from Noisy Annotations," arXiv: 1904.07934v2, Jun. 9, 2019 (9 pages).
Mexiadis, et al., "Evaluating a Dancer's Performance Using Kinect-Based Skeleton Tracking," in Proceedings of the 19th ACM international conference on Multimedia (2011) (4 pages).
Borgefors, "Distance Transformations in Arbitrary Dimensions," Computer Vision, Graphics, and Image Processing, 27 (1984) (25 pages).
Brox, et al., "High Accuracy Optical Flow Estimation Based on a Theory for Warping," in European Conference on Computer Vision, Springer, 2004 (13 pages).
Butt, et al., "Optimum Design of Chamfer Distance Transforms," IEEE Transactions on Image Processing, vol. 7, No. 10, Oct. 1998 (8 pages).
Cordts, et al., "The Cityscapes Dataset for Semantic Urban Scene Understanding," arXiv: 1604.01685v2, Apr. 7, 2016 (29 pages).
Bob D. de Vos, et al., "End-to-End Unsupervised Deformable Image Registration with a Convolutional Neural Network," in Deep Learning in Medical Image Analysis and Multimodal Learning for Clinical Decision Support, Springer, 2017 (9 pages).
Deng, "The MNIST Database of Handwritten Digit Images for Machine Learning Research," [Best of the Web], IEEE Signal Processing Magazine, Nov. 2012 (2 pages).
Deng, et al., "Probabilistic Neural Programmed Networks for Scene Generation," 32nd Conference on Neural Information Processing Systems (2018) (11 pages).
Eslami, et al., "Attend, Infer, Repeat: Fast Scene Understanding with Generative Models," arXiv: 1603.08575v3, Aug. 12, 2016 (17 pages).
Gavrila, et al., "Multi-Feature Hierarchical Template Matching Using Distance Transforms," in Proc, IEEE International Conference on Pattern Recognition (1998) (7 pages).
Grauman, et al., "Fast Contour Matching Using Approximate Earth Mover's Distance," in Proceedings of the IEEE Conference on Computer Vision and Pattern Recognition, Jun. 2004 (8 pages).
Guan, et al., "Deformable Cardiovascular Image Registration via Multi-Channel Convolutional Neural Network," IEEE Access (2019) (11 pages).
Hanocka, et al., "ALIGNet: Partial-Shape Agnostic Alignment via Unsupervised Learning," arXiv:1804.08497v2, Oct. 30, 2018 (14 pages).
Hirshberg, et al., "Coregistration: Simultaneous Alignment and Modeling of Articulated 3D Shape," in European Conference on Computer Vision. Springer, 2012 (14 pages).
Jaderberg, et al., "Spatial Transformer Networks," arXiv:1506.02025v3, Feb. 4, 2016 (15 pages).
Kanazawa, et al., "Warpnet: Weakly Supervised Matching for Single-View Reconstruction," arXiv:1604.05592v2, Jun. 20, 2016 (9 pages).
Kamewar, et al., "MSG-GAN: Multi-Scale Gradient GAN for Stable Image Synthesis," arXiv:1903.06048v2, Mar. 22, 2019 (9 pages).
Klein, et al., "Elastix: A Toolbox for Intensity-Based Medical Image Registration," IEEE Transactions on Medical Imaging, vol. 29, No. 1, Jan. 2010 (10 pages).
Miao, et al., "Dilated FCN for Multi-Agent 2D/3D Medical Image Registration," the 32nd AAAI Conference on Artificial Intelligence (2018) (8 pages).
Moore, "The Evolution of the Concept of Homeomorphism," Historia Mathematica, 34 (2007) (11 pages).
Macken, "Chamfer Metrics in Mathematical Morphology," Journal of Mathematical Imaging and Vision, 4 (1994) (21 pages).
Ronneberger, et al. "U-Net: Convolutional Networks for Biomedical Image Segmentation," arXiv:1505.04597v1, May 18, 2015 (8 pages).
Rother, et al., "Grabcut: Interactive Foreground Extraction Using Iterated Graph Cuts," in ACM transactions on graphics (TOG) (2004) (6 pages).
Saxena, et al., "A survey of Recent and Classical Image Registration Methods," International Journal of Signal Processing, Image Processing and Pattern Recognition, vol. 7, No. 4 (2014) (10 pages).
Sun, et al., "Learning Optical Flow," in European Conference on Computer Vision, Springer, 2008 (16 pages).
Yu, et al., "CASENet: Deep Category-Aware Semantic Edge Eetection," In Proceedings of the IEEE Conference on Computer Vision and Pattern Recognition (2017) (10 pages).
Yu, et al., "Simultaneous Edge Alignment and Learning," arXiv:1808.01992v3, Oct. 26, 2018 (30 pages).
Zlateski, et al., "On the Importance of Label Quality for Semantic Segmentation," in Proceedings of the 2018 IEEE/CVF Conference on Computer Vision and Pattern Recognition (9 pages).
Lin, et al., "Feature Pyramid Networks for Object Detection," arXiv: 1612.03144v2, Apr. 19, 2017 (10 pages).
Lindeberg, "Scale-Space Theory: A Basic Tool for Analyzing Structures at Different Scales," Journal of Applied Statistics (1994) (47 pages).
Lowe, "Object Recognition from Local Scale-Invariant Features," Proc. of the International Conference on Computer Vision (1999) (8 pages).
Pan, et al., "Fully Convolutional Neural Networks with Full-Scale-Features for Semantic Segmentation," In 31st AAAI Conference on Artificial Intelligence (2017) (7 pages).
Philbin, et al., "Object Retrieval with Large Vocabularies and Fast Spatial Matching," in 2007 IEEE Conference on Computer Vision and Pattern Recognition (8 pages).
Redmon, et al, "YOLO9000: Better, Faster, Stronger," in Proceedings of the IEEE Conference on Computer Vision and Pattern Recognition (2017) (9 pages).
Sun, et al., "Secrets of Optical Flow Estimation and Their Principles," in 2010 IEEE Computer Society Conference on Computer Vision and Pattern Recognition (8 pages).

* cited by examiner

| Application | Method | Loss | Error (%px ≤ Z) | Metric |
|---|---|---|---|---|
| Noisy digit contour alignment | Given test pairs | - | 10.20 (39%) | Chamfer Score: lower the better. |
| | DIRNet [7] | Normalized Cross-Correlation | 8.10 (46%) | |
| | DIRNet [7] | Local Shape-dependent Chamfer Upperbound | 4.83 (69%) | |
| | ALIGNet [14] | Mean Squared Error | 6.69 (55%) | |
| | ALIGNet [14] | Local Shape-dependent Chamfer Upperbound | 4.04 (71%) | |
| | System 10 | Normalized Cross-Correlation | 5.46 (64%) | |
| | System 10 | Asymmetric Chamfer | 3.38 (89%) | |
| | System 10 | Reparametrized bi-directional Chamfer | 2.91 (93%) | |
| | System 10 | Local Shape-dependent Chamfer Upperbound | 2.17 (96%) | |
| Geo-parcel alignment | Given test pairs | - | 42.38 (48%) | Chamfer Score: lower the better. |
| | DIRNet [7] | Normalized Cross-Correlation | 41.36 (48%) | |
| | DIRNet [7] | Local Shape-dependent Chamfer Upperbound | 27.70 (65%) | |
| | ALIGNet [14] | Mean Squared Error | 39.58 (59%) | |
| | ALIGNet [14] | Local Shape-dependent Chamfer Upperbound | 31.37 (62%) | |
| | System 10 | Normalized Cross-Correlation | 32.78 (61%) | |
| | System 10 | Asymmetric Chamfer | 28.05 (67%) | |
| | System 10 | Local Shape-dependent Chamfer Upperbound | 20.63 (75%) | |

FIG. 8

| Label Quality | 4px error | 8px error | 16px error | 32px error | Real Coarse |
|---|---|---|---|---|---|
| Num Clicks per Image | 175.23 | 95.63 | 49.21 | 27.00 | 98.78 |
| Test IoU | 74.85 | 53.32 | 33.71 | 19.44 | 48.67 |
| GrabCut [24] | 26.00 | 28.51 | 29.35 | 25.99 | 32.11 |
| STEALNet [1] | 78.93 | 69.21 | 58.96 | 50.35 | 67.43 |
| System 10 | 79.41 | 69.73 | 67.51 | 61.05 | 71.45 |

FIG. 10

COMPUTER VISION SYSTEMS AND METHODS FOR UNSUPERVISED LEARNING FOR PROGRESSIVELY ALIGNING NOISY CONTOURS

RELATED APPLICATIONS

This application claims priority to U.S. Provisional Patent Application Ser. No. 62/939,770 filed on Nov. 25, 2019, the entire disclosure of which is hereby expressly incorporated by reference.

BACKGROUND

Field of the Disclosure

The present disclosure relates generally to the field of computer vision. More specifically, the present disclosure relates to computer vision systems and methods for unsupervised learning for progressively aligning noisy contours.

Related Art

Contour alignment is a fundamental problem in computer vision across a variety of applications and graphics fields including, but not limited to, skeleton/silhouette alignment (e.g., for animation retargeting), semantic boundary alignment, and shape to scan alignment. Contour alignment is especially challenging when the observations are partial, noisy, and largely misaligned. In the past, contour alignment problems have been approached by finding key points or features of shapes and aligning them by optimizing for parameters of a predefined class of transformations such as affine or rigid transforms. However, these approaches may not be effective for shapes whose alignment requires a different transform. Nonrigid registration approaches that utilize intensity based similarity metrics are also known. However, these approaches are generally computationally expensive and sensitive to corrupted pixels. Recent deep learning based approaches utilize ConvNet based architectures for shape alignment/registration. However, these approaches tend to fail in noisy, partially observed, and largely misaligned shape contexts. This is due, in part, to a direct prediction of alignment warp in one step at original scale and training with proximity insensitive pixel level similarity metrics such as normalized cross correlation (NCC) or mean squared error (MSE).

Therefore, there is a need for computer vision systems and methods which can utilize a deep network architecture to learn to align a pair of contour images while being robust to noise and partial occlusions in the images and improving an ability of computer systems to more efficiently process data. These and other needs are addressed by the computer vision systems and methods of the present disclosure.

SUMMARY

The present disclosure relates to computer vision systems and methods for unsupervised learning for progressively aligning noisy contours. In particular, the system allows for noisy digit contour alignment, geo-parcel to aerial image alignment and coarse-label refinement by utilizing a deep convolutional neural network (CNN) that learns (without supervision) to align noisy contours in a multiscale fashion by employing progressively increasing complex transformations over increasing scales. Additionally, the system trains the CNN with a local shape-dependent Chamfer upper bound loss function that measures proximity and local shape similarity while being robust towards noise and partial occlusions.

BRIEF DESCRIPTION OF THE DRAWINGS

The foregoing features of the disclosure will be apparent from the following Detailed Description, taken in connection with the accompanying drawings, in which:

FIG. 8 is a table illustrating quantitative processing results for noisy digit contour alignment and geo-parcel to aerial image alignment based on different network models and loss functions;

FIG. 10 is a table illustrating quantitative processing results for coarse-label refinement based on different network models;

DETAILED DESCRIPTION

Figure 1:
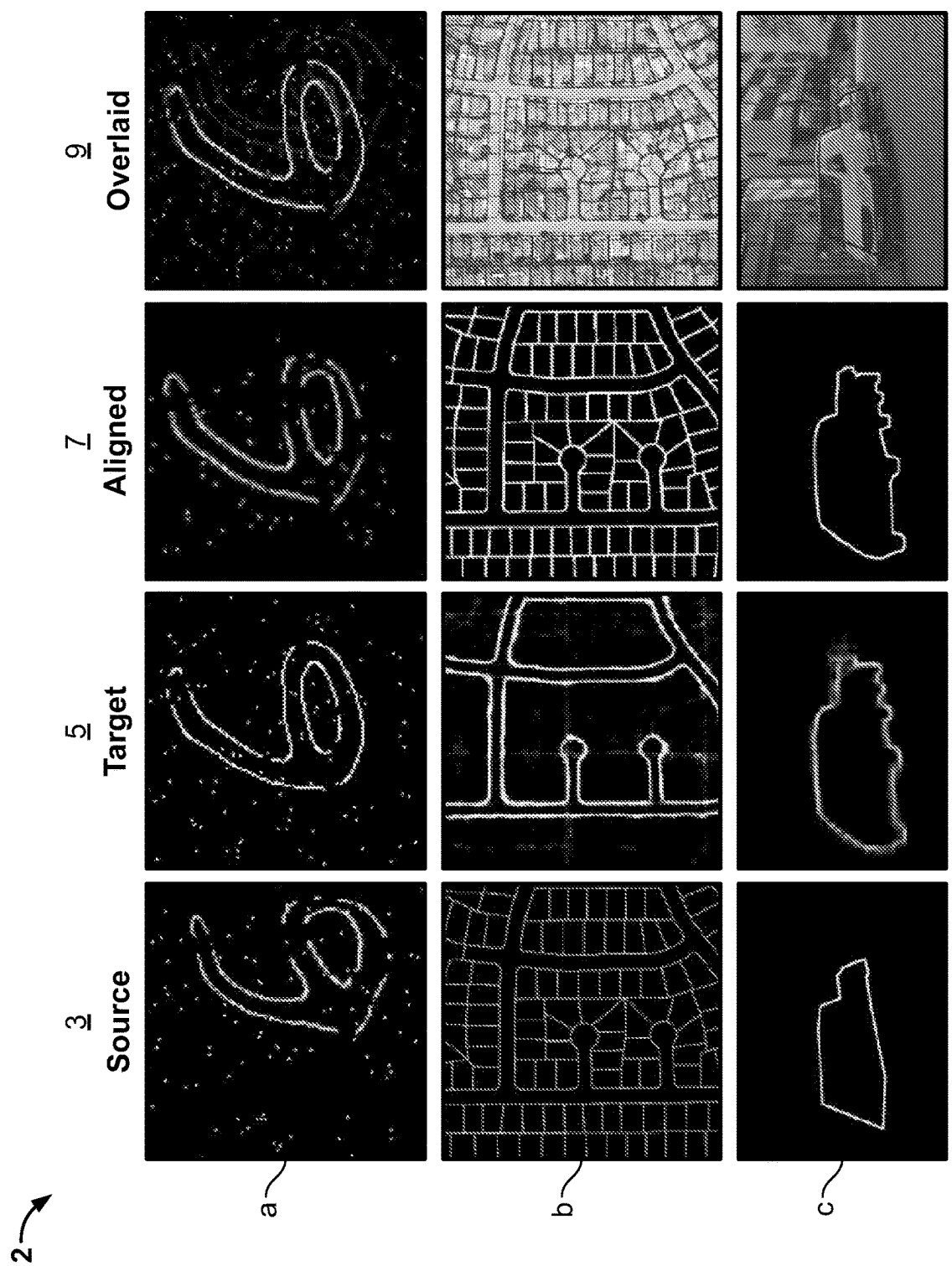
FIG. 1 is a diagram illustrating applications of the system of the present disclosure.

The present disclosure relates to computer vision systems and methods for unsupervised learning for progressively aligning noisy contours, as discussed in detail below in connection with FIGS. 1-12.

By way of background, deep learning approaches for shape alignment are known. For example, deep networks have been employed to directly estimate warp parameters and are trained utilizing ground-truth warp fields/parameters. However, it is challenging to collect ground-truth warp fields for several real world applications, especially for non-rigid alignment scenarios. As such, recent approaches utilize unsupervised methods for non-rigid registration. One such approach utilizes, as a deep network, a de-formable image registration network (DIRNet) consisting of a convolutional neural network (CNN) based regressor that predicts a deformation field followed by a spatial transformation function that warps a source to target image. The regressor utilizes concatenated pairs of source and target images and predicts displacement vector fields directly from convolutional features. These fields are then upsampled utilizing splines to original resolutions and used to warp the source images. The DIRNet and similar models are trained with pixel-wise similarity metrics and therefore can only process small scale deformations. Another approach utilizes, as a deep network, ALIGNet which constitutes a regression network and an integrator layer that outputs a free form deformation field.

Multiscale feature based approaches for incremental alignment are known and utilized to address large scale displacements in the fields of image registration and optical flow. These approaches aid with increasing search scope and to escape local minima. Multiscale feature based approaches can also be implemented with deep network architectures. For example, some approaches utilize input images or their features at different resolutions to improve object detection and segmentation. Recent versions of several popular object detection frameworks such as You Only Look Once (YOLO) employ multiscale processes to detect objects at multiple scales of the feature hierarchy independently and fuse them for robust detections. For semantic label and contour estimation, several approaches exploit lateral/skip connections that associate low level feature maps across resolutions and semantic levels. The systems and methods of the present disclosure utilize a deep network that solves the alignment problem incrementally by estimating transformations at multiple scales.

A commonly utilized approach when estimating complex transformations is to begin by estimating a simple transformation (e.g., an affine transformation) and then progressively increasing the transformation complexity to refine the estimates. The rationale being that estimating a very complex transformation can be difficult and computationally inefficient in the presence of noise such that a robust and quick approximate estimate of a simpler transformation can be utilized as a starting point while also regularizing the subsequent estimations of more complex transformations. The system of the present disclosure utilizes this approach with complex misalignments. In particular, the system begins at coarser scales by estimating an affine transformation (e.g., a liner transformation with six degrees of freedom (DOF)) capable of modeling translation, rotation, non-isotropic scaling, and shear. This estimated affine grid is refined through finer scale networks which employ more flexible transformations (e.g., thin plate splines).

Proximity metrics such as the Chamfer distance and the Earth-mover distance are widely known in shape correspondences but are known to be computationally expensive. However, when shapes are represented in binary contour images, a morphological distance transform can be utilized to compute the Chamfer distance between two contour images efficiently. Despite its utility, it should be understood that the morphological distance transform is imperfect. In particular, the morphological distance transform includes a process for collecting all nonzero pixels to find the nearest one (e.g., a set-collection operation) that is non-differentiable. Additionally, the morphological distance transform is blind to noise pixels while computing a distance to the nearest pixel. The aforementioned imperfections negatively impact a distance estimate between shapes.

The systems and methods of the present disclosure derive a loss function based on the Chamfer distance that overcomes the aforementioned problems. Chamfer distance measures a proximity between contours and can therefore provide informative gradients even though a spatial overlap between contour images is nonexistent. As described above, Chamfer distance can be utilized for binary shape alignment and can be implemented by utilizing a morphological distance transform. Since this distance transform is not differentiable for w.r.t. warp parameters, the system utilizes a reparameterization process to make it differentiable and compatible with BackProp. However, this reparameterization process requires measuring a backward/inverse transform to align the target image to the source image. Therefore, the system reverses the roles of the source and target features in the system alignment modules to yield a backward transform with the same network components and without additional parameters and/or layers. Additionally, this forward-backward transform consistency constraint acts as a powerful regularizer that improves generalization capabilities.

As mentioned above, Chamfer distance is amenable to noise as it utilizes Euclidean distance to find nearest pixels, and it neglects local shape statistics around pixels. However, the system of the present disclosure utilizes a data dependent distance which is a combination of Euclidean and local shape similarity metrics. This modification increases the derived loss function's robustness to noise pixels. The system of the present disclosure also derives an upper bound of the loss function which is differentiable and computationally efficient. Since one instance of the loss function is utilized at each scale, this multiscale objective passes gradients to all the network layers simultaneously. Accordingly, training the system network is more stable and less sensitive to hyperparameters such as learning rates. Additionally, the training process is unsupervised since it does not require ground truth warps that the network is expected to reproduce. By training with the aforementioned loss function that accounts for local shape contexts while being invariant to corrupted pixels, the network of the system learns to be robust to noise and partial occlusions.

Turning to the drawings, FIG. 1 is a diagram 2 illustrating applications of the system of the present disclosure. As described above, the system of the present disclosure determines an optimal transformation that aligns source to target contour images in a noisy context. In particular, the system executes noisy contour alignment by employing a multiscale contour alignment network that utilizes progressively increasing complex scales over increasing scales and a local shape-dependent Chamfer upper bound loss function that measures proximity and local shape similarity while being robust towards noise and partial occlusions. As shown in FIG. 1, the system can be applied to noisy digit contour alignment by utilizing the Modified National Institute of Standards and Technology (MNIST) dataset, geo-parcel to aerial image alignment (e.g., aligning geo-parcel boundaries with road contours in aerial images), and coarse-label refinement (e.g., refining coarsely annotated segmentation labels). As shown in FIG. 1, images 3a-9a respectively illustrate source, target, aligned and overlaid noisy digit contour alignment images where overlaid image 9a is evidences improved visualization with blue (B), green (G), and red (R) channels from the source image 3a, target image 5a and the aligned image 7a. Images 3b, 5b, 7b, and 9b illustrate, respectively, a geo-parcel image (e.g., an aerial image), target road contours extracted from the aerial image, an aligned parcel image, and an overlaid image where the overlaid image 9b is overlaid with original (e.g., misaligned) and aligned parcel contours. Additionally, images 3c, 5c, 7c, and 9c illustrate, respectively, a source image (e.g., a coarsely annotated image), target contours extracted from the coarsely annotated image, an aligned image, and an overlaid image where the overlaid image 9c is overlaid with original (e.g., misaligned) and aligned contours.

Figure 2:
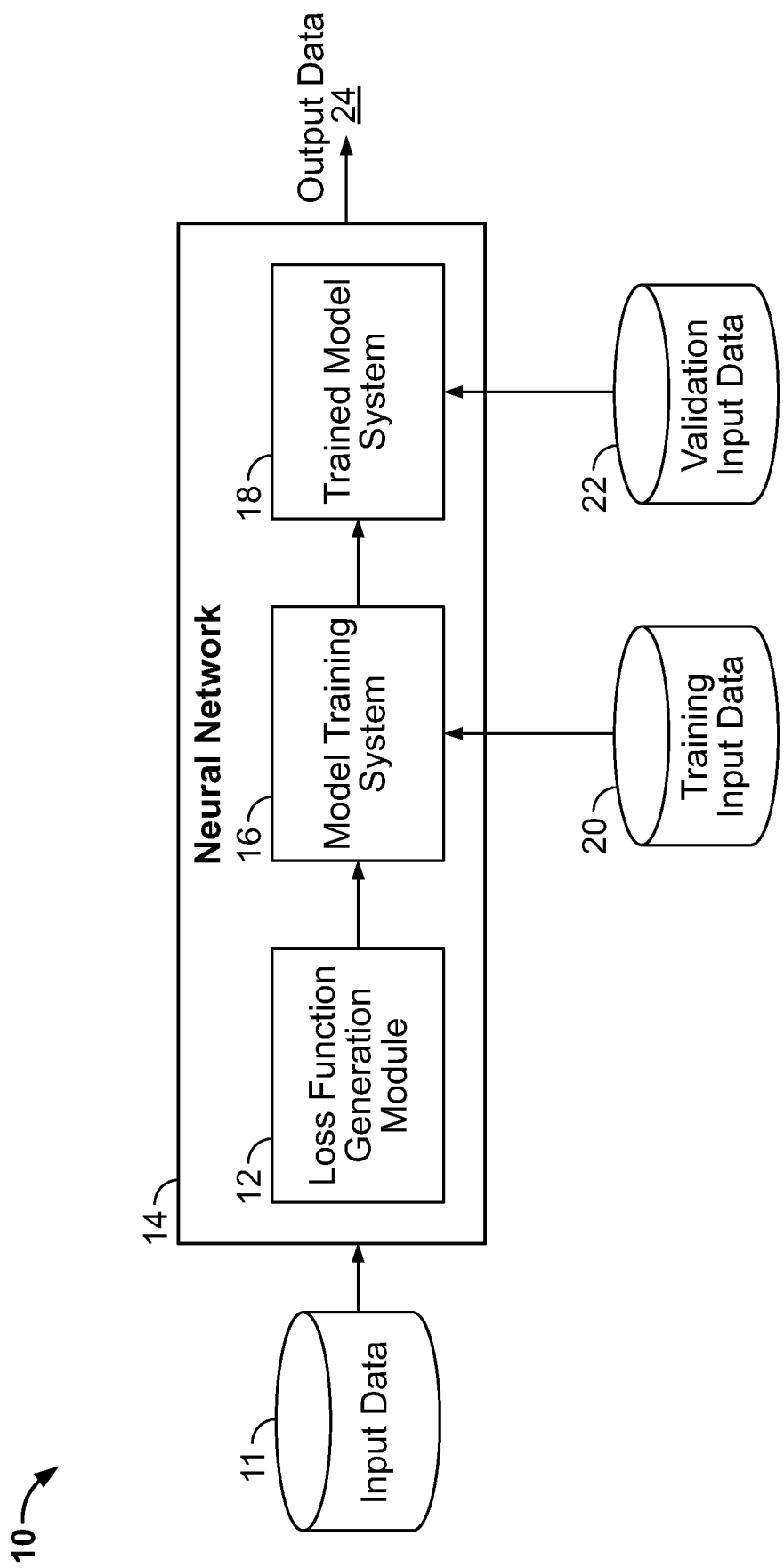
FIG. 2 is a diagram illustrating an embodiment of the system of the present disclosure.

FIG. 2 is a diagram illustrating an embodiment of the system 10 of the present disclosure. The system 10 includes a neural network 14 which receives input data 11 and includes a loss function generation module 12, a model training system 16, and a trained model system 18. The neural network 14 also receives training input data 20 and validation input data 22, and outputs output data 24. The neural network 14 can be any type of neural network or machine learning system, or combination thereof, modified in accordance with the present disclosure to include the components shown and described herein. For example, the neural network 14 can be a deep convolutional neural network capable of, for example, noisy contour alignment and can use one or more frameworks (e.g., interfaces, libraries, tools, etc.). It should be understood that the neural network 14 can include the loss function generation module 12 as a layer of the neural network 14.

Figure 3:
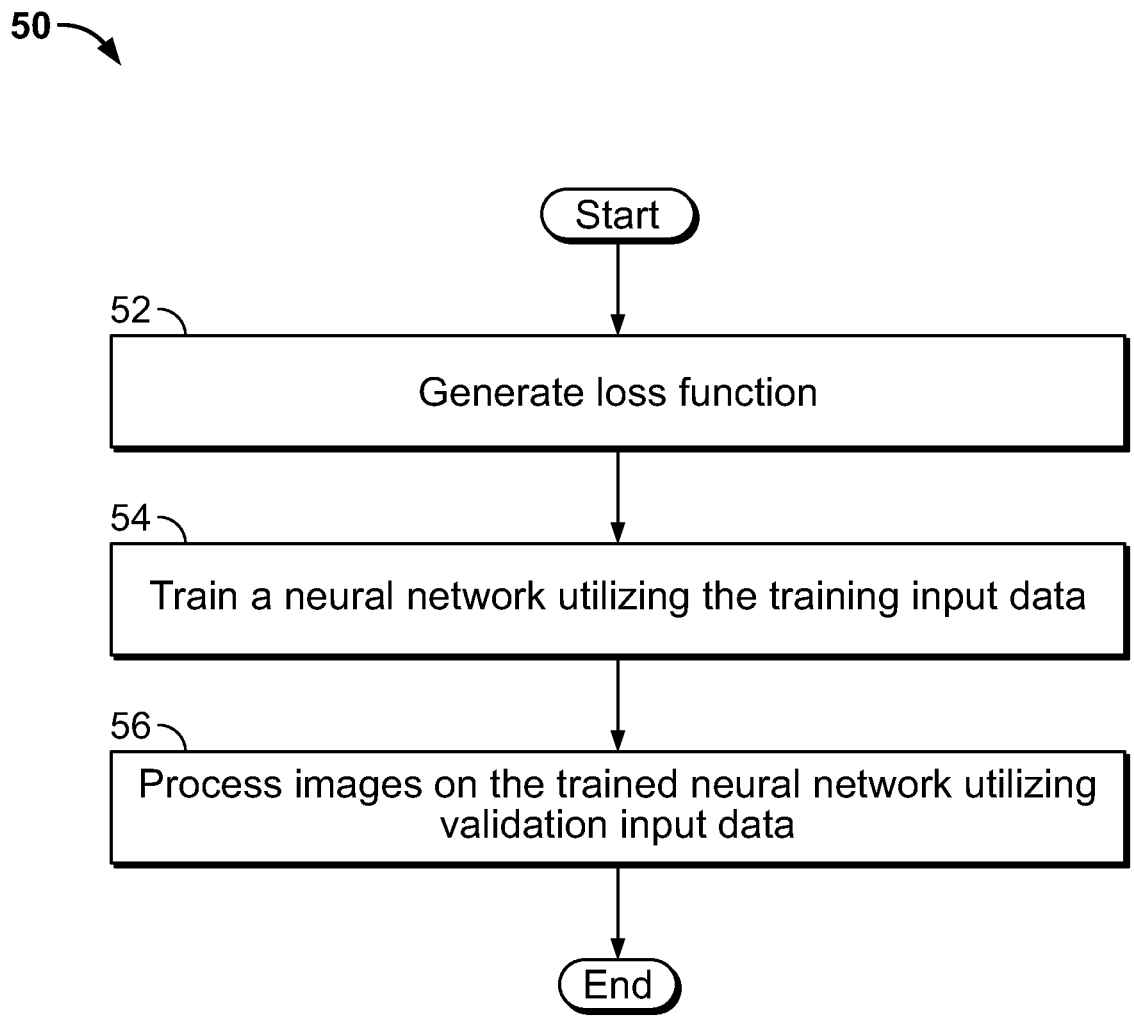
FIG. 3 is a flowchart illustrating overall processing steps carried out by the system of the present disclosure.

FIG. 3 is a flowchart 50 illustrating overall processing steps carried out by the system 10 of the present disclosure. Beginning in step 52, the loss function generation module 12 generates a local shape-dependent Chamfer upper bound alignment loss function. As mentioned above, the local shape-dependent Chamfer upper bound loss function measures proximity and local shape similarity while being robust towards noise and partial occlusions. In step 54, the model training system 16 trains the neural network 14 utilizing the local shape-dependent Chamfer upper bound alignment loss function on training input data 20. In particular, the model training system 16 trains the neural network 14 to learn (without supervision) to align noisy contours in a multiscale fashion by employing progressively increasing complex transformations over increasing scales. The training input data 20 can include, but is not limited to, a predetermined number of images of the MNIST dataset, a predetermined number of parcel and aerial image pairs of an image dataset, and a predetermined number of images of a CityScapes dataset. It should be understood that the neural network 14 can be any type of neural network or machine learning system, or combination thereof, modified in accordance with the present disclosure. Then, in step 56, the trained model system 18 processes validation input data 22 to determine whether the system 10 can align noisy contours. The validation input data 22 can include, but is not limited to, a predetermined number of images of the MNIST dataset, the image dataset, and the CityScapes dataset.

Figure 4:
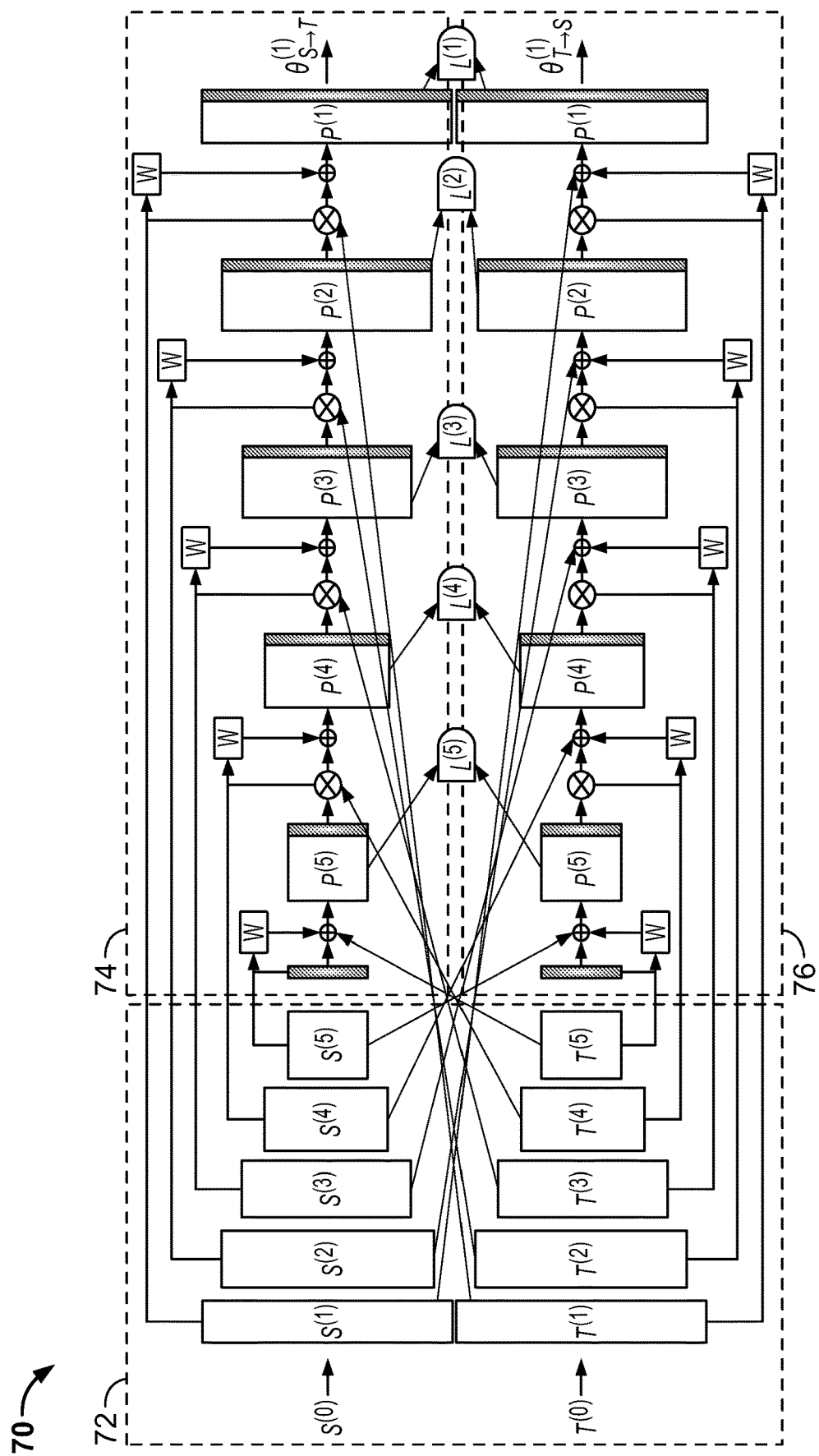
FIG. 4 is a diagram illustrating neural network processing carried out by the system of the present disclosure.

FIG. 4 is a diagram 70 illustrating neural network processing carried out by the system 10 of the present disclosure. As shown in FIG. 4, the system 10 includes an architecture having a CNN module 72, a forward transformation module 74 and a backward transformation module 76. The CNN module 72 includes base CNN blocks to extract features $S^{(i)}$ and $T^{(i)}$ of source and target images at different scales. Each of the forward and backward transformation modules 74, 76 include, at each scale, warp predictors $P^{(i)}$ that predict warp fields with a predefined class of transformations, a warp layer w that warps each of the extracted features $S^{(i)}$ and $T^{(i)}$ utilizing the warp fields, and a loss function $L^{(i)}$. It should be understood that i denotes an index of scale where i=0 denotes an original (e.g., finest) scale and i=K denotes a coarsest scale.

The forward transformation module 74 estimates a forward transformation that aligns the source image to the target image. It initializes the transformation with an identity warp grid and refines it utilizing the multiscale warp predictors $P^{(i)}$. The forward transformation module 74 commences the refinement process by utilizing a simple affine transformation at the coarsest scale which is a linear transformation with six DOF. The estimated affine transform grid is utilized to align source features $S^{(i)}$ via the warp layer w. The aligned features are then passed along with the estimated affine transform grid through the next finer scale network which estimates a warp field utilizing flexible transformations such as thin-plate splines (tps). As the system 10 moves toward the finest scale, the system 10 utilizes tps transforms with increasing resolutions of a control point grid. The final estimate of the geometric transformation is obtained from the finest scale predictor that learns to compose the coarser transformations along with local refinements that align its input features. As described in further detail below, the loss function $L^{(i)}$ requires a backward transform to be measured that aligns the target image to the source image. Accordingly, the backward transformation module 76 estimates a backward transform that aligns the target image to the source image by utilizing the same warp predictor components but with a second pass by reversing the roles of the source and target features.

Figure 5:
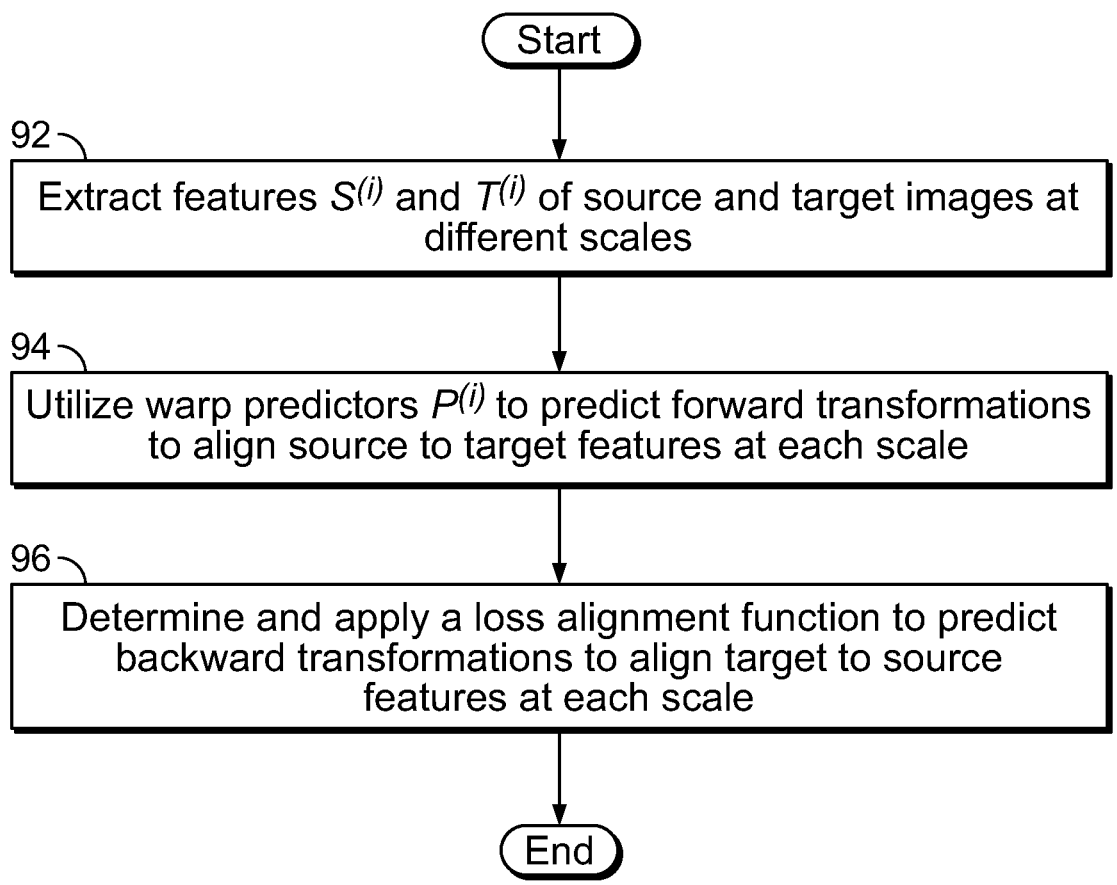
FIG. 5 is a flowchart illustrating step 54 of FIG. 3 in greater detail.

FIG. 5 is a flowchart illustrating step 54 of FIG. 3 in greater detail. Beginning in step 92, the system 10 extracts the feature representations $\{(S^{(i)}, T^{(i)})_{(w)}^{K}\}$ of the source and target input image pair $(S^{(0)}, T^{(0)}) \in R^{h \times w \times c}$ from different scales $i \in \{1, 2, \ldots, K\}$ of fully convolutional backbone networks $F_s$ and $F_t$ where K=5. It should be understood that depending on a visual diversity of source and target shape domains, the system 10 can tie or not tie the weights of $F_s$ and $F_t$. For example, the system 10 shares the weights of $F_s$ and $F_t$ for noisy digit contour alignment because the source and target appearance distributions are similar in the MNIST dataset. Alternatively, the system 10 does not share the weights of $F_s$ and $F_t$ for geo-parcel contour alignment because the source and target contours are visually different.

In step 94, the system 10 utilizes a cascade of warp predictors $P^{(i)}$ to predict transformations to align source to target features at each scale. In particular, each warp predictor $P^{(i)}$ block takes a feature tensor that is a result of concatenating (denoted by $\oplus$ and as shown in FIG. 4) three features: (i) source features warped by the warp field from a previous coarser scale but upsampled (denoted by $\otimes$ and as shown in FIG. 4) by a factor of two, (ii) target features, and (iii) an upsampled warp field from a previous coarser scale. Mathematically, a warp predictor $P^{(i)}$ at a given scale i learns the functionality $P^{(i)}: S^{(i)}(\theta_{\otimes 2}^{i+1}) \oplus T^{(i)} \oplus \theta_{\otimes 2}^{i+1} \to \theta^{(i)}$ where $\theta_{\otimes u}$ denotes a warp field $\theta$ upsampled by a factor of u. The system 10 initializes $\theta^{K+1}$ as an identity warp field at the coarsest scale K. These warp predictors $P^{(i)}$ by design resemble known Spatial Transformer Networks. In general, they have a regression network that predicts parameters of the transformations, followed by a grid layer that converts parameters to a pixel level warp field. The regression network includes a cascade of convolutional layers with leaky rectified linear unit (leakyReLU) nonlinearity and a fully connected block to output the warp parameters. A warp or sampling layer w utilizes the fields from the grid layer to warp source features. For dense displacement fields, a fully convolutional regressor directly estimates the warp field and passes to the warp layer w.

Then, in step 96, the system 10 determines and applies a loss alignment function $L^{(i)}$ to estimate backward transforms to align target to source features at each scale. This multiscale loss objective results in a stable training procedure as it passes multiscale gradients to all warp predictors $P^{(i)}$ simultaneously and can be denoted by Equation 1 as follows:

$$L_{MS} = \sum_{i=1}^{K} L^{(i)} = \sum_{i=1}^{K} L(S^{(0)}(\theta_{\otimes 2^i}^{(i)}), T^{(0)}) \qquad \text{Equation 1}$$

where $\theta_{\otimes 2}^{(i)}$ denotes a warp field predicted at scale i but upsampled by a factor $2^i$ that increases the warp field to be a similar resolution as input images $S^{(O)}$ and $T^{(O)}$.

It should be understood that L can denote any alignment loss function (e.g., a Normalized Cross Correlation (NCC) or a Mean Square Error (MSE) loss function). However, since pixel-wise similarity metrics suffer in large scale misalignment by not considering the proximity of shapes, the system 10 utilizes a local shape dependent Chamfer upper bound loss alignment function for the multiscale loss objective. As described above, the Chamfer distance is a known approach for determining a proximity between two shapes or contours and was initially utilized for point sets. In particular, for any given point set X and Y, the Chamfer distance C is defined by Equation 2 below as:

$$C(X, Y) = \frac{1}{N_X} \sum_{x \in X} \min_{y \in Y} E(x, y) + \frac{1}{N_Y} \sum_{y \in Y} \min_{x \in X} E(y, x) \quad \text{Equation 2}$$

where E(x, y) denotes a Euclidean distance between the points x and y, $N_X$ denotes a number of points in X and $N_Y$ denotes a number of points in Y. In the binary image representation of shapes, concepts of morphological distance transform can be utilized to effectively compute the Chamfer distance between two images. The Morphological Distance Transform (MDT) computes a Euclidean distance to a nearest nonzero pixel for each pixel x in a given contour image I represented by dt $[I](x) = \min_{i \in I} E(x, i)$. Utilizing MDT, the Chamfer distance between S and T can be defined as $$C(S, T) = \frac{1}{N_s} dt[S] \cdot T + \frac{1}{N_x} S \cdot dt[T]$$

where (.) denotes a scalar product and $N_S$ and $N_T$ denote a number of nonzero pixels in S and T respectively. There are several efficient implementations to compute dt[.]. Accordingly, the loss alignment function L at any scale is defined by Equation 3 as follows:

$$C(S(\theta), T) = \frac{1}{N_S} dt[S(\theta)] \cdot T + \frac{1}{N_T} S(\theta) \cdot dt[T] \quad \text{Equation 3}$$

The distance transform operation dt must be differentiable wrt $S(\theta)$ to utilize the loss function of Equation 3 with BackProp. However, dt is not differentiable as it has a set-collection process to collect all nonzero pixels. The system 10 overcomes this by utilizing a reparameterization process inspired by homeomorphism properties of affine/tps transformations. In particular, if a forward transformation $\theta_{S \to T} \in \Theta$ aligns S with T then there exists a $\theta_{T \to S}$ also $\in \Theta$ that aligns T with S given that $\Theta$ is a homeomorphic transformation group. This results in the corollary that $dt[S(\theta_{S \to T})] \cdot T = dt[S] \cdot T(\theta_{T \to S})$. With this reformulation, Equation 3 becomes:

$$C_r(S(\theta), T) = dt[S] \cdot T(\theta_{T \to S}) + S(\theta_{S \to T}) \cdot dt[T] \quad \text{Equation 4}$$

The gradient of the loss function of Equation 4 does not require dt to be differentiable. Distance transform (dt) maps can be computed externally and supplied as reference signals. However, it should be understood that the loss function of Equation 4 requires estimating a backward transform $\theta_{T \to S}$.

For affine, the backward transform $\theta_{T \to S}$ can be analytically computed by utilizing a matrix inverse. However, it is challenging to realize an analytical inverse for tps and other fully flexible transforms. As such, the system 10 computes backward transforms by a second pass through warp predictors by reversing the roles of source and target features. The loss in Equation 4 constrains the forward and backward transforms to be consistent with each other. This constraint acts as a powerful regularizer on network training. As described in further detail below, the system 10 demonstrates that it improves the generalization capabilities of the network models.

The aforementioned Chamfer loss is susceptible to noise and occlusions in contour images as it computes a distance from a nearest nonzero pixel without evaluating if it is a noise pixel or indeed a part of a contour. Accordingly, the system 10 incorporates local shape dependency into the distance computation to determine the nearest pixels based on spatial proximity and local shape similarity to make the Chamfer loss robust towards noise and occlusions. The system 10 utilizes first-order intensity gradients as a local shape dependency metric for computational simplicity. More specifically, the system 10 considers unit gradients as a representation of local tangents of the contours. It should be understood that several sophisticated local shape metrics can be utilized. The system 10 utilizes a combination of Euclidean distances in Cartesian and image gradient space such that the local shape-dependent Chamfer distance is defined by Equation 5 below as:

$$C_d(X, Y) = \frac{1}{N_X} \sum_{x \in X} \min_{y \in Y} (E(x, y) + \lambda E(I'_x, I'_y)) + \\ \frac{1}{N_Y} \sum_{y \in Y} \min_{x \in X} (E(y, x) + \lambda E(I'_y, I'_x)) \quad \text{Equation 5}$$

where $I'_x$ denotes the unit gradient vector computed at point x. Since the Chamfer distance includes a data-dependent term, the concept of MDT cannot be utilized as in Equation 4. However and as shown in Equation 5, min arguments before the distance terms in Equation 5 provide for the use of the "min-max inequality" property which results in an upper bound for Equation 5 with two simple terms. In particular, the system 10 utilizes the min-max inequality to reformulate Equation 5 such that the concepts of MDT and reparameterization as in Equation 4 can be utilized. As shown in Equation 6 below, the min-max inequality states that a minimum of a sum of any two arbitrary functions f(x) and g(x) is upper bounded by a sum of a minimum and maximum of individual functions.

$$\min_x(f(x) + g(x)) \leq \min_x f(x) + \max_x g(x) \quad \text{Equation 6}$$

Under the mild assumptions that $\max_x f \geq \max_x g$, it can be proven that this is the tightest upper bound. Utilizing the inequality for the first term on the right hand side of Equation 5 yields Equation 7 below as:

$$\sum_{x \in X} \min_{y \in Y} (E(x, y) + \lambda E(I'_x, I'_y)) \leq \quad \text{Equation 7}$$

-continued $$\sum_{x \in X} \min_{y \in Y} E(x, y) + \lambda \sum_{x \in X} \max_{y \in Y} E(I'_x, I'_y)$$

Utilizing the inequality for both terms on the right hand side of Equation 5 yields an upper bound with the original chamfer distance of Equation 2 and shape-dependent terms as follows in Equation 8 below:

$$C_d(X, Y) \le \qquad \text{Equation 8}$$
$$C(X, Y) + \alpha \left( \frac{1}{N_X} \sum_{x \in X} \max_{y \in Y} E(I'_x, I'_y) + \frac{1}{N_Y} \sum_{y \in Y} \max_{x \in X} E(I'_y, I'_x) \right)$$

Rewriting the above upper bound in the context of source to target alignment yields Equation 9 as follows:

$$C_d(S(\theta), T) \le \qquad \text{Equation 9}$$
$$C(S(\theta), T) + \alpha \left( \frac{1}{N_{S(\theta)}} \sum_{x \in S(\theta)} \max_{y \in T} E(I'_x, I'_y) + \frac{1}{N_T} \sum_{y \in T} \max_{x \in S(\theta)} E(I'_y, I'_x) \right)$$

The upper bound is denoted as $C_{up}$. The shape dependent terms are computationally heavy as the maximum is taken over the window of the entire image for each pixel in the other image. However, the system 10 constrains this window to be local and search in the neighborhood defined by the window. This maximum finding operation can be implemented with MaxPool layers. Accordingly, the local shape-dependent Chamfer upper bound is defined by Equation 10 below as [EVV: Mark, I am not sure whether this is the right formula. Portions of the formula were crossed out in the disclosure]:

$$C_{up}(S, T) = \left( \frac{1}{N_S} dt[S] \cdot T(\theta_{T \to S}) + \frac{1}{N_T} S(\theta_{S \to T}) \cdot dt[T] \right) + \qquad \text{Equation 10}$$
$$\alpha \left( \frac{1}{N_{S(\theta)}} \sum_{x \in S(\theta)} \max_{y \in T_x} E(I'_x, I'_y) + \frac{1}{N_T} \sum_{y \in T} \max_{x \in S_y(\theta)} E(I'_y, I'_x) \right)$$

As described above, this upper bound is a weighted combination of Chamfer loss that measures proximity and a local shape-dependent loss. The shape-dependent terms are distances between unit gradients as shown in Equation 11 below as:

$$E(I'_x, I'_y) = \sqrt{|I'_x - I'_y|_2^2} = \sqrt{I'^2_x + I'^2_y - 2 I'^T_x \cdot I'_y} \propto \sqrt{1 - I'^T_x \cdot I'_y} \qquad \text{Equation 11}$$

When the local window is restricted to 1×1, minimizing the above term relates to maximizing a cross correlation in intensity gradient space. Additionally, when raw pixel intensities are utilized in place of gradients, this maximizes the NCC-related metric. Accordingly, Equation 12 defines the upper bound loss with unit gradients as local shape measures as follows:

$$C_{up}(S(\theta), T) = \left( \frac{1}{N_S} dt[S] \cdot T(\theta_{T \to S}) + \frac{1}{N_T} S(\theta_{S \to T}) \cdot dt[T] \right) + \qquad \text{Equation 11}$$

$$\alpha \left( \frac{1}{N_{S(\theta)}} \sum_{x \in S(\theta)} \max_{y \in T_x} \sqrt{1 - I'^T_x \cdot I'_y} + \frac{1}{N_T} \sum_{y \in T} \max_{x \in S_x(\theta)} \sqrt{1 - I'^T_y \cdot I'_x} \right)$$

Substituting the local shape-dependent Chamfer upper bound loss into Equation 1, yields the multiscale objective utilized by the system 10 and defined by Equation 13 below as:

$$L_{MS} = \sum_{i=1}^{K} C_{up}\left(S^{(i)}(\theta^{(i)}_{x2^i}), T^{(0)}\right) \qquad \text{Equation 13}$$

Training, testing, and results of the system 10 will now be described in greater detail in relation to FIGS. 6-11. As mentioned above, the system 10 can execute contour alignment applications including, but not limited to, noisy digit contour alignment utilizing MNIST digits, geo-parcel to aerial image alignment, and coarse-label refinement.

Figure 6:
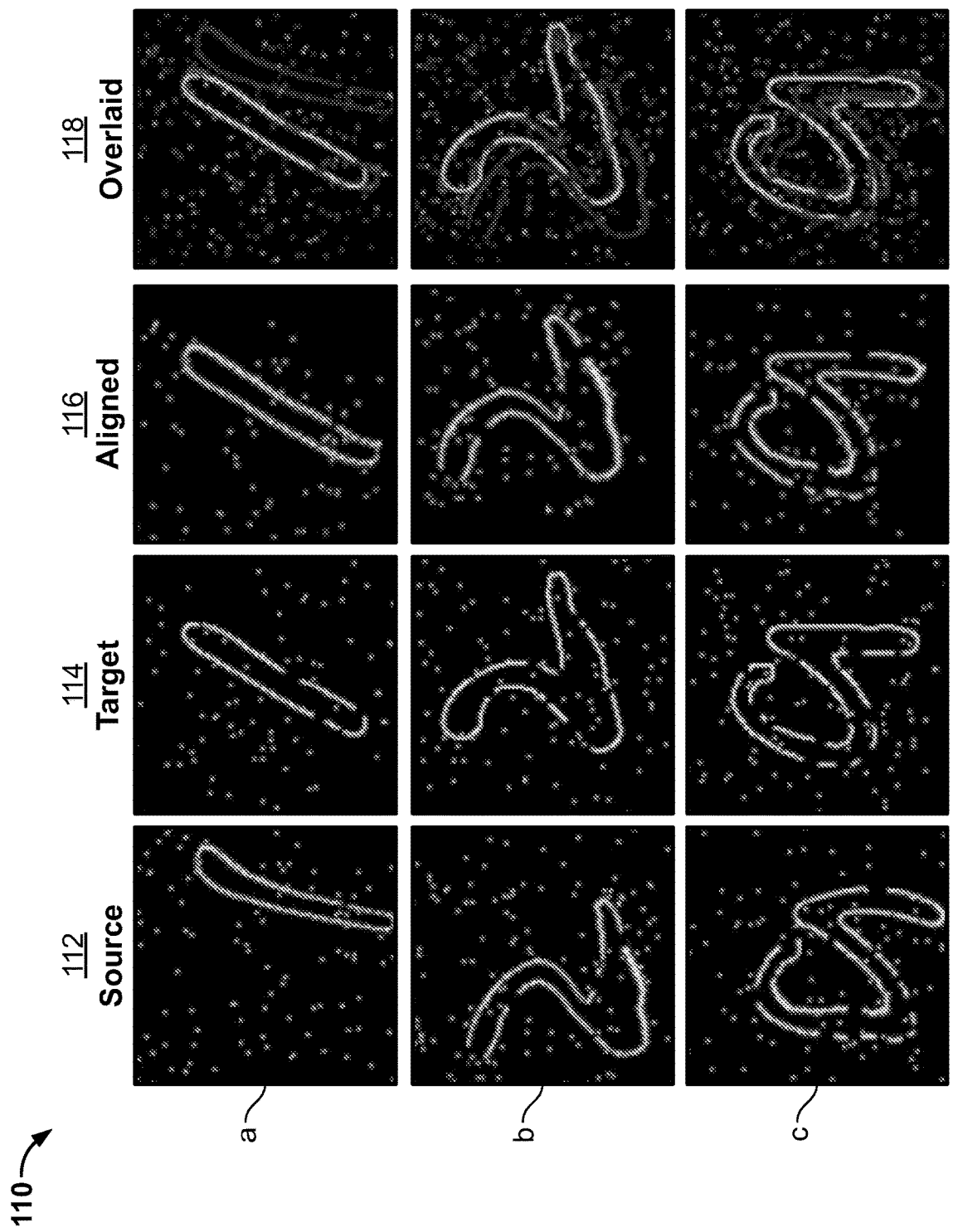
FIG. 6 is a compilation of images illustrating image processing carried out by the system of the present disclosure for noisy digit contour alignment.

FIG. 6 is a compilation of images 110 illustrating image processing carried out by the system 10 of the present disclosure for noisy digit contour alignment utilizing MNIST digits. As shown in FIG. 6, images 112a-c, 114a-c, 116a-c and 118a-c respectively illustrate source, target, aligned and overlaid noisy digit contour alignment images where overlaid images 118a-c respectively evidence better visualization with B, G, R channels from the source images 112a-c, the target images 114a-c and the aligned images 116a-c. The MNIST dataset is a known toy dataset to understand the behavior of models and training processes sans extended training periods. The system 10 utilizes the MNIST dataset for the same purpose but modifies the dataset to suit the task of noisy digit contour alignment. The MNIST dataset includes 70,000 grayscale images of handwritten digits of resolution 28×28. The system utilizes 60,000 images for training and 10,000 images for testing the network 14. In particular, the system 10 upsamples each digit image to 128×128 resolution and converts each digit image to a contour image. Each contour image is then transformed with randomly generated tps transformations to create a misaligned source contour image while the original image is considered as the target image. Additionally, the system 10 randomly adds noise and occlusions to simulate partial noisy observations of the contours.

The system 10 utilizes a CNN base which extracts features of source and target images separately with shared weights for noisy digit contour alignment. The CNN base includes convolutional (Conv) blocks of similar layer setup (e.g., three Conv+leakyReLU layers with a filter size of 5×5 followed by a MaxPool layer with a stride 2 and kernel size of 2×2). The multiscale alignment part includes five warp predictors that operate on five scales and predict increasingly complex transforms. The system 10 utilizes affine transforms at the coarsest scale and tps with control grids of increasing resolutions (e.g., 2×2, 4×4, 8×8, 16×16) at finer scales. Warp predictor blocks are composed of three Conv layers and a fully connected multilayer perception (MLP) layer. Each Conv layer is followed by a leakyReLU+MaxPool layer except the final Conv layer. The MLP layer utilizes flattened Conv features of the final layer to predict parameters required for the transform at that scale (e.g., a tps warp predictor outputs 2n+6 values while an affine predictor outputs 6 values). The system 10 also sets hyperparameters $\lambda_i=1.0$ and $\alpha=1e-2$ for all tests. The system 10 trains the network 14 for 10 epochs without supervision utilizing the local shape-dependent Chamfer upper bound loss function. Additionally, the system 10 utilizes a stochastic gradient descent (SGD) optimizer with a learning rate of 1e-5.

Figure 7:
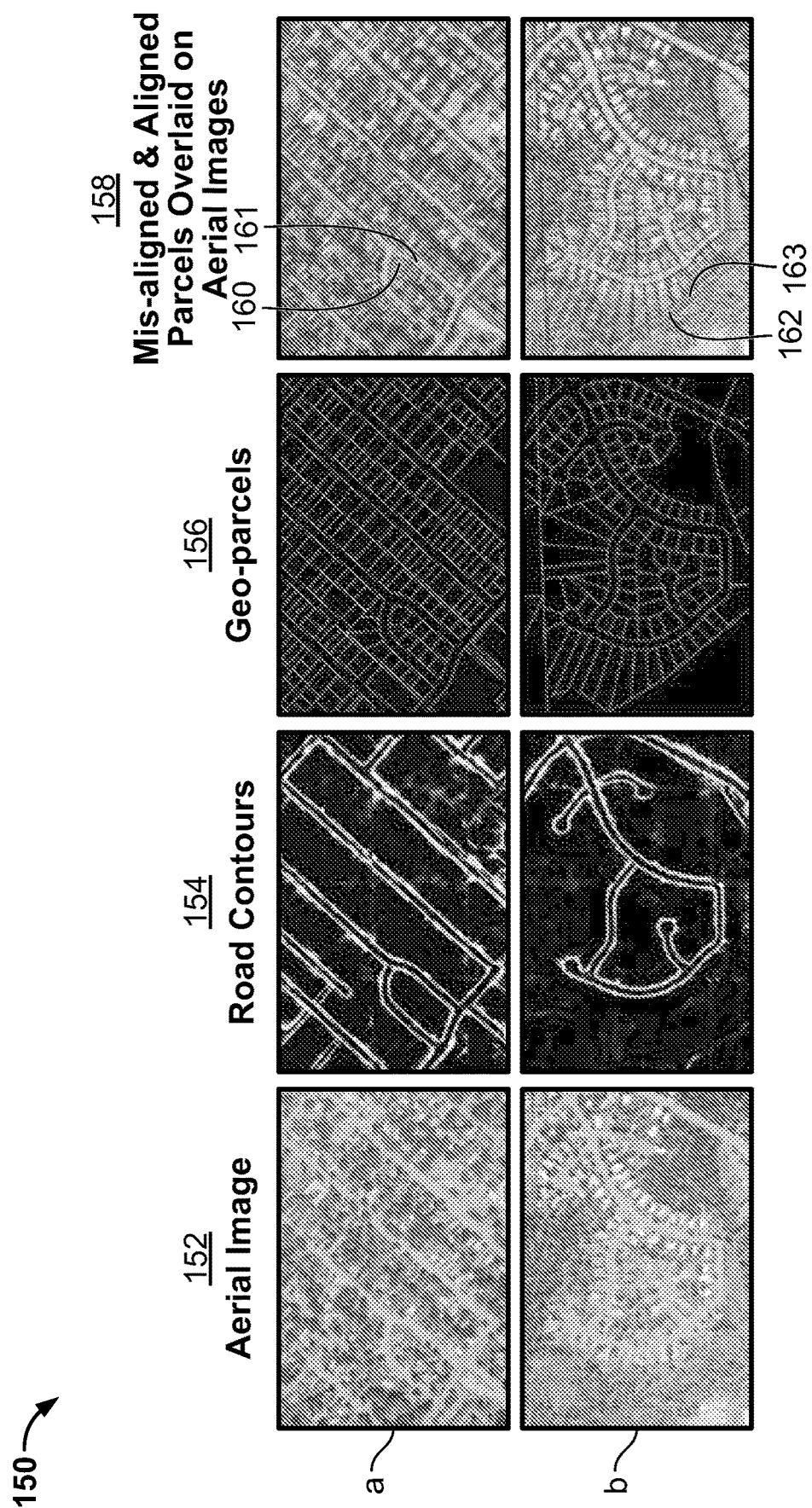
FIG. 7 is a compilation of images illustrating image processing carried out by the system of the present disclosure for geo-parcel to aerial image alignment.

FIG. 7 is a compilation of images 150 illustrating image processing carried out by the system 10 of the present disclosure for geo-parcel to aerial image alignment. In particular, FIG. 7 illustrates aerial images 152a-b, road contour images 154a-b, geo-parcel binary contour images 156a-b, and overlaid parcel images 158a-b. Geo-parcel data is utilized to identify public and private land property boundaries. Parcels are shape files with latitude and longitude Global Positioning System (GPS) coordinates of the parcel land boundaries maintained by local counties. These parcel shapes can be projected (utilizing perspective projection) onto a coordinate system of a camera with which an aerial image thereof is captured. This process results in geo-parcel binary contour images 156a-b. These contours should match the visual contours present in corresponding aerial images 152a-b. However, due to differences in the collection processes of the aerial images 152a-b and the corresponding geo-parcel binary contour images 156a-b, these two modalities of geo-spatial data often misalign by a large extent (e.g., 10 meters). For example, overlaid parcel images 158a-b respectively illustrate misaligned parcels 160 and 162 and aligned parcels 161 and 163 overlaid on corresponding aerial images 152a-b. It should be understood that when these two modalities of geo-spatial data are aligned, they are useful in property assessment and tax/insurance underwriting processes. As such, the system 10 extracts road contours (including sidewalks) from the aerial images 152a-b using contour detection to be target contours as shown in road contour images 154a-b. As shown in FIG. 7, these extracted road contours are noisy and partial in shape. The system 10 trains the network 14 to align parcel contours with these extracted road contours from the aerial images 152a-b.

The system 10 utilizes a dataset including 1,189 parcel and aerial image pairs captured above residential areas to train the network 14 for geo-parcel to aerial image alignment. It should be understood that the system 10 does not require any ground truth alignment parameters to train the network 14. However, the system 10 utilizes a testing dataset including 27 manually aligned parcel and aerial image pairs having more than 7,000 parcel polygons. Additionally, the system 10 utilizes input images of 1024×512 resolution. The base CNN feature extractors include five Conv blocks of similar layer setup (e.g., three Conv+leakyReLU layers followed by a MaxPool layer). In contrast to noisy digit contour alignment, weights are not shared in geo-parcel to aerial image alignment because the source and target contour appearance distributions are different. The system 10 trains the network 14 for 10 epochs without supervision utilizing the local shape-dependent Chamfer upper bound loss function. The system 10 also utilizes the SGD optimizer with a learning rate of 1e-5.

FIG. 8 is a table 170 illustrating quantitative processing results for noisy digit contour alignment and geo-parcel to aerial image alignment based on different network models and loss functions. As shown in FIG. 8, the Chamfer scores are reported along with a percentage of pixels whose misalignment is less than Z pixels where Z=5 for noisy digit contour alignment and Z=20 for geo-parcel to aerial image alignment.

Regarding noisy digit contour alignment, the system 10 utilizes an asymmetric Chamfer distance between aligned source and target images (e.g., non-noisy versions), 1/NS $(\theta_{S \to T}) \cdot dt[T]$, as it measures an average misalignment in the units of pixels. As shown in FIG. 8, test set image pairs are misaligned by an average of 10.20 pixels and the percentage of pixels with misalignment under five pixels is 39%. In comparing the system 10 with the DIRNet and ALIGNet, it is evident that the system 10 consistently outperforms the DIRNet in all tests even when trained with the NCC loss at each scale and consistently outperforms the ALIGNet in all tests even when trained with the MSE loss at each scale. The performance of the system 10 can be attributed to utilizing the multiscale and alignment processes of the system network architecture. For example, FIG. 8 illustrates that a testing performance of the DIRNet is improved to 69% from 46% when the DIRNet is trained with the local shape-dependent Chamfer upper bound loss of the system 10. Additionally, FIG. 8 illustrates that a testing performance of the ALIGNet is improved to 71% from 55% when the ALIGNet is trained with the local shape-dependent Chamfer upper bound loss of the system 10. As such, it appears that the proximity measuring capabilities of the local shape-dependent Chamfer upper bound loss also improves a performance of the DIRNet and of the ALIGNet. FIG. 8 also illustrates that the system 10 yields a performance improvement of 4% when trained with the reparametrized bi-directional Chamfer loss compared to the asymmetric Chamfer loss. This improvement demonstrates the regularization capabilities of forward-backward consistency constraints of the loss. Overall, the system 10 achieves a greatest performance of 96% when trained with the local shape-dependent Chamfer upper bound loss function which represents approximately a 50% performance improvement over the DIRNet trained with the NCC and approximately a 41% performance improvement over the ALIGNet trained with the MSE.

Regarding geo-parcel to aerial image alignment, the percentage of pixels whose misalignment is less than Z pixels where Z=20 is indicative of misalignment under three feet (e.g., 20 pixels as a ground-sampling distance is 4.5 cm/px for the aerial data). The results illustrated by FIG. 8 can be understood in relation to FIG. 7. As such, referring back to FIG. 7, each of the aligned parcels 161 in overlaid parcel image 158a and each of the aligned parcels 163 in overlaid parcel image 158b is indicative of parcel data aligned by the system 10 when trained with the local shape-dependent Chamfer upper bound loss function. As shown in FIG. 7, the aligned parcels 161 and 163 better align with respective aerial images 152a-b than the mis-aligned and original parcels 160 and 162. Referring back to FIG. 8, in comparing the system 10 with the DIRNet and ALIGNet, it is evident that the system 10 consistently outperforms the DIRNet in all tests even when trained with the NCC loss at each scale and the ALIGNet in all tests even when trained with the MSE loss at each scale. The performance of the system 10 can be attributed to utilizing the multiscale and alignment processes of the system network architecture. For example, FIG. 8 illustrates that a testing performance of the DIRNet is improved to 65% from 48% when the DIRNet is trained with the local shape-dependent Chamfer upper bound loss of the system 10. Additionally, FIG. 8 illustrates that a testing performance of the ALIGNet is improved to 62% from 59% when the ALIGNet is trained with the local shape-dependent Chamfer upper bound loss of the system 10. As such, it appears that the proximity measuring capabilities of the local shape-dependent Chamfer upper bound loss also improves a performance of the DIRNet and of the ALIGNet. Overall, the system 10 achieves a greatest performance of 75% when trained with the local shape-dependent Chamfer upper bound loss function which represents approximately a 27% performance improvement over the DIRNet trained with the NCC and approximately a 16% performance improvement over the ALIGNet trained with the MSE. As such, the system 10 improves an alignment quality of these parcels with the corresponding aerial image contents by at least 16%.

Figure 9:
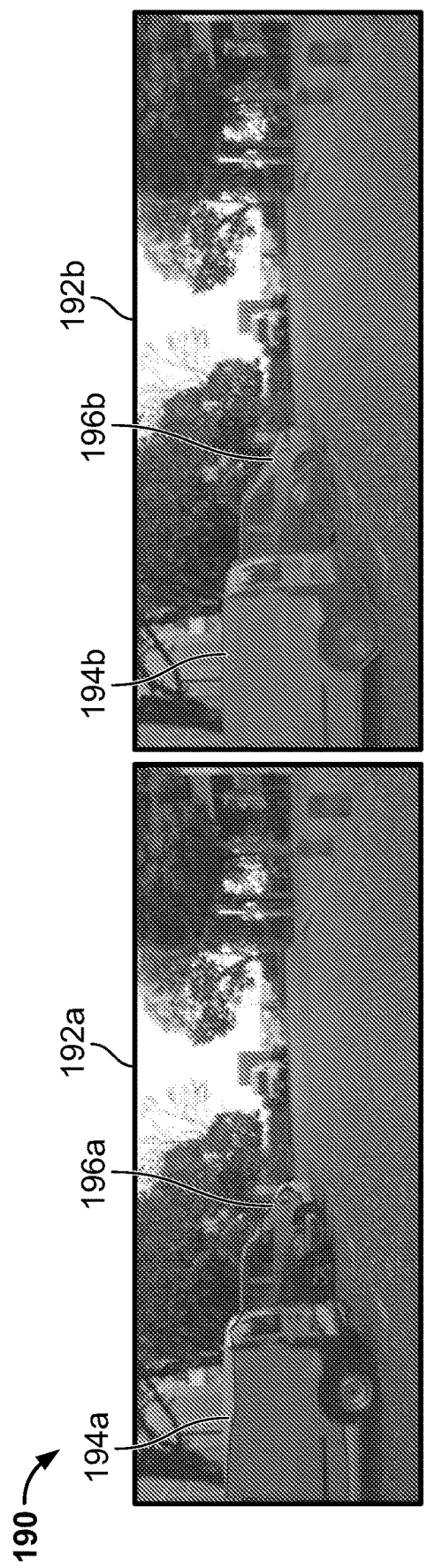
FIG. 9 depicts a pair of images illustrating image processing carried out by the system of the present disclosure for coarse-label refinement.

FIG. 9 depicts a pair of images 190 illustrating image processing carried out by the system 10 of the present disclosure for coarse-label refinement. In particular, FIG. 9 illustrates an image 192a having coarser annotations 194a and 196a and an image 192b having refined the coarser annotations 194a and 196a to extract precise labels 194b and 196b. As shown in FIG. 9, the system 10 can obtain precisely refined labels from a coarse segmentation mask.

The system 10 utilizes a CityScapes dataset which is a publicly available benchmark for traffic scene semantic segmentation. The CityScapes dataset includes a training dataset having 2,975 images, a validation dataset having 500 images, and a training-extra dataset having 19,998 images. The images of the training-extra dataset only include coarser annotations (e.g., as shown in image 3c of FIG. 1 and image 192a of FIG. 9) while the images of each of the training and validation datasets include finely and coarsely annotated ground truth labels.

The system 10 utilizes, as a semantic contour extraction method, the Category-Aware Semantic Edge Detection Network (CASENet) which is pretrained on the training dataset. In particular, the system 10 utilizes the CASENet to extract contours from images treated as target shapes based on context. The coarsely annotated labels can be considered as source contours and to be aligned with the CASENet model contour predictions. The base CNN feature extractors include five Conv blocks of similar layer setup (e.g., three Conv+leakyReLU layers followed by a MaxPool layer). In contrast to noisy digit contour alignment and geo-parcel to aerial image alignment, the tps control grid resolutions of $P^{(3)}$ and $P^{(4)}$ are doubled. The system 10 trains the network 14 for 10 epochs without supervision utilizing the local shape-dependent Chamfer upper bound loss function. The system 10 also utilizes the SGD optimizer with a learning rate of 1e-5.

FIG. 10 is a table 210 illustrating quantitative processing results for coarse-label refinement based on different network models. As shown in FIG. 10, Real Coarse corresponds to the coarsely human annotated validation set, the x-px error corresponds to simulated coarse data and scores are reported as a percentage indicative of mean Intersection-over-Union (IoU). The system 10 trains the network 14 on the training dataset and the trained network 14 refines coarse data on the validation set. Additionally, for training dataset augmentation and quantitative study, the finer labels are synthetically coarsened via a synthetic coarsening process. This synthetic coarsening process first erodes the finer segmentation mask and then simplifies mask boundaries utilizing the Douglas-Peucker polygon approximation method to produce masks with controlled quality. As mentioned above, the IoU metrics between these coarser and finer labels of the validation dataset are shown in FIG. 10. Additionally, a number of vertices in the simplified polygon are counted and reported as an estimate of a number of clicks required to annotate such object labels. The STEALNet model addresses the problem of refining coarser annotation labels. As such, in evaluating the system 10, STEALNet is utilized as a baseline for comparison along with the GrabCut tool.

As shown in FIG. 10, in comparing the system 10 with the STEALNet and GrabCut tool, it is evident that the system 10 consistently outperforms the GrabCut tool in all misalignments and performs equally well with the STEALNet at lower-scale alignments. It is also evident that the performance of the system 10 exceeds that of the STEALNet with respect to larger misalignments (e.g., 16px and 32px errors). Additionally, the system 10 yields approximately a 4% testing performance improvement compared to the STEALNet on the real coarser labels of the validation dataset. As such, it appears that the system 10 can be utilized in annotation tools to improve annotation efficiency.

Figure 11:
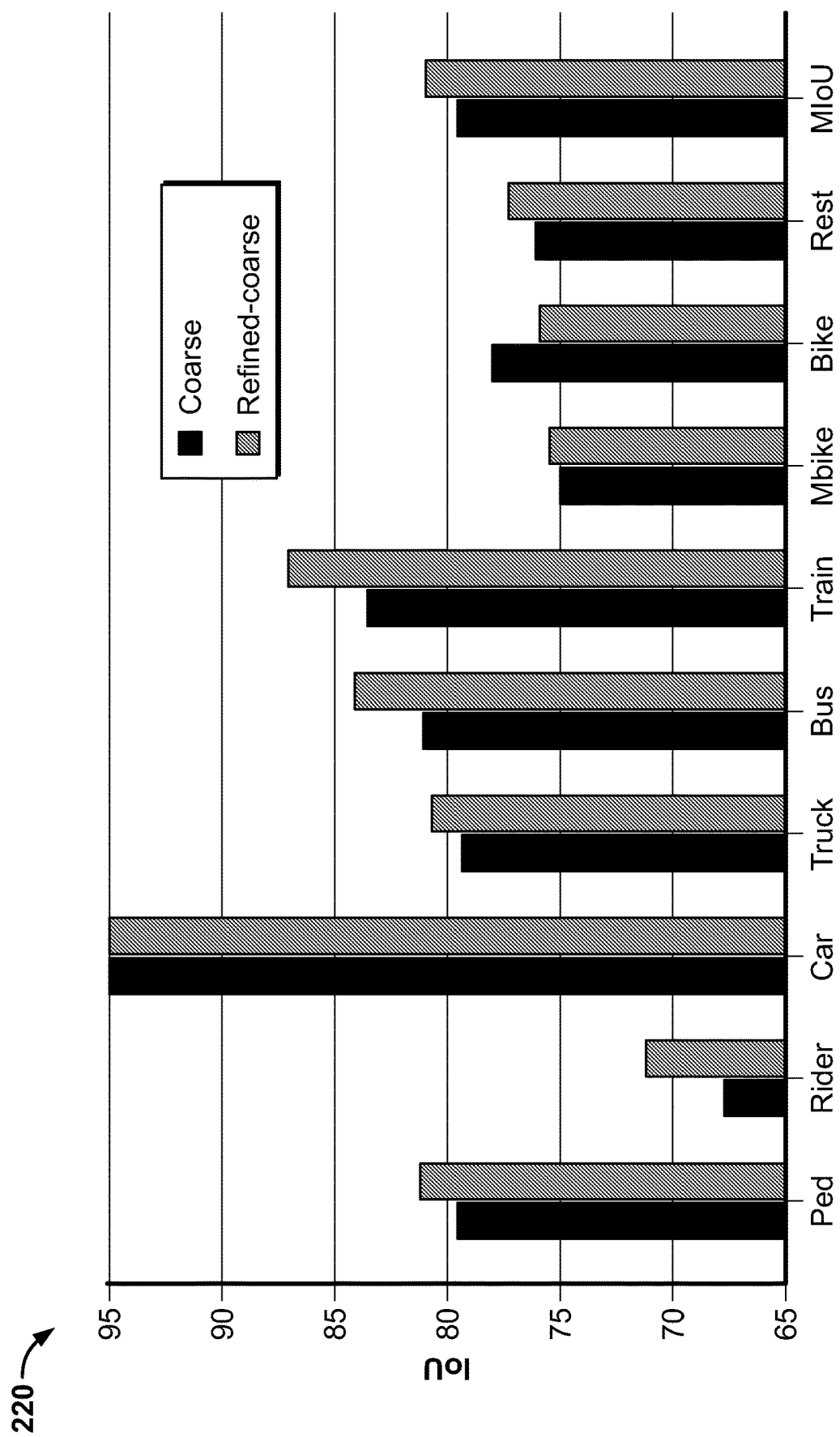
FIG. 11 is a graph illustrating quantitative processing results for coarse-label refinement based on different labels.

FIG. 11 is a graph 220 illustrating quantitative processing results for coarse-label refinement based on different labels. In particular, FIG. 11 illustrates semantic segmentation performed on the CityScapes validation dataset based on a comparison between a UNet model when trained with coarse labels (in addition to the training dataset) and when trained with the system 10 refined labels of the training-extra dataset set. As shown in FIG. 11, eight object classes (e.g., pedestrian, rider, car, truck, bus, train, motorbike and bike) are refined in the training-extra dataset. The system 10 trains the UNet based semantic segmentation architecture with the same set of hyper-parameters with and without refinement on the coarse labels of the training-extra dataset. A performance of each object class is reported as an IoU percentage. For example, training with the refined labels yields improvements of more than 3 IoU % for the rider, bus and train object classes as well as 1.5 IoU % in the overall mean IoU (e.g., 79.52% vs. 81.01%).

As described above, the system 10 allows for noisy digit contour alignment, geo-parcel to aerial image alignment, and coarse-label refinement by utilizing a deep CNN that learns (without supervision) to align noisy contours in a multiscale fashion by employing progressively increasing complex transformations over increasing scales. Additionally, the system 10 trains the CNN with a local shape-dependent Chamfer upper bound loss function that measures proximity and local shape similarity while being robust towards noise and partial occlusions. Preliminary results on the MNIST dataset evidences the potential of the system 10, indicating up to 50% points improvement over the DIRNet model. Additionally, preliminary results on the parcel and aerial image pair test dataset also evidences the potential of the system 10, achieving a 27% points improvement over test pairs when trained with the local shape-dependent Chamfer upper bound loss function. Preliminary results on the CityScapes dataset also evidence the potential of the system 10, indicating approximately a 4% point improvement over the STEALNet model. It should be understood that additional testing of the system 10 can be performed on other datasets and in comparison to other models. The system 10 utilizes naïve concatenation for feature fusion in warp predictors and simple first order gradients as local shape-dependent features. It should be understood that certain modifications of the system 10 can include other fusing schemes (e.g., cost volumes) and sophisticated/learnable shape metrics. The system 10 can also be improved by fine-tuning the neural network 14 on training data provided with each dataset.

Figure 12:
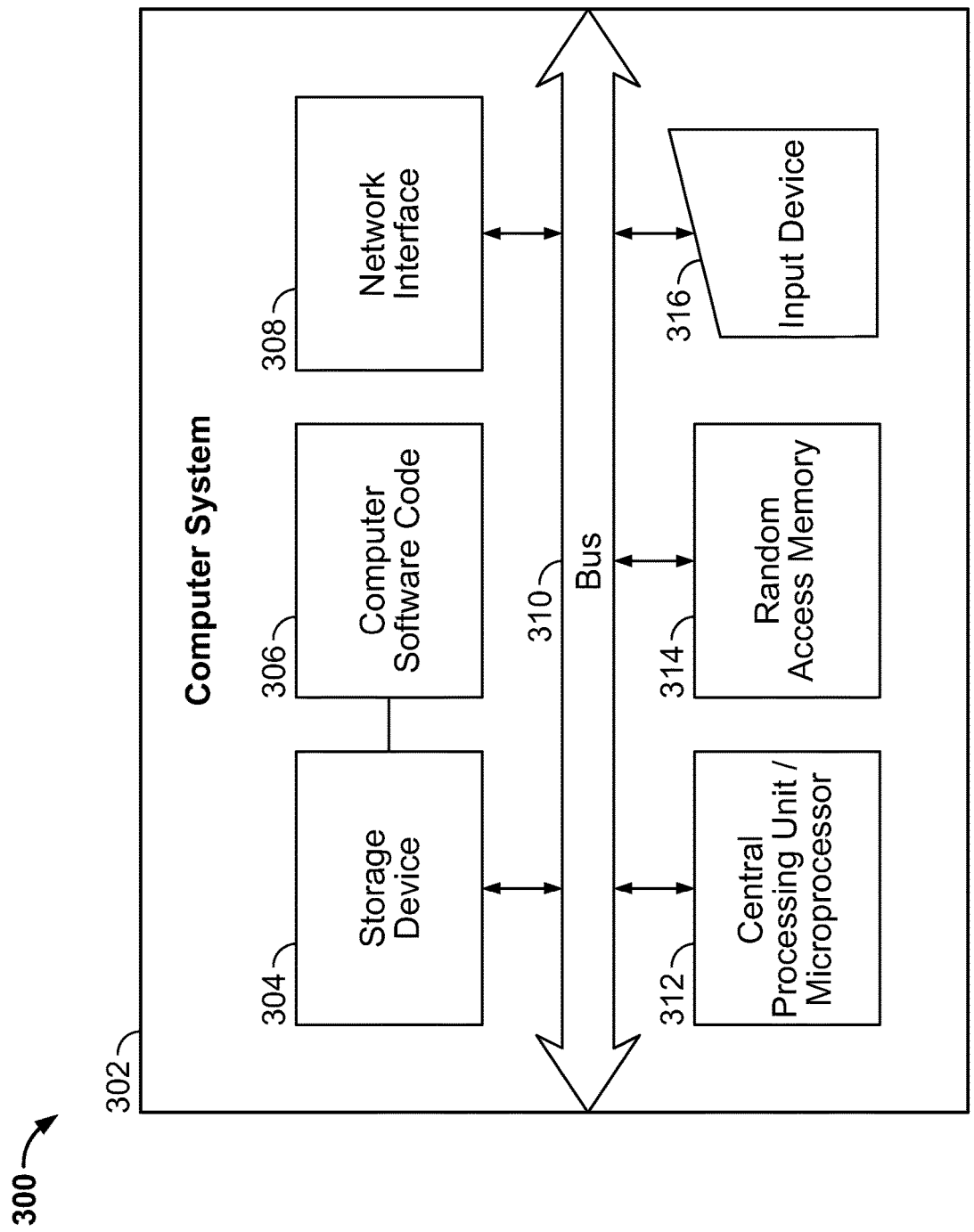
FIG. 12 is a diagram illustrating hardware and software components capable of being utilized to implement an embodiment of the system of the present disclosure.

FIG. 12 is a diagram 300 showing hardware and software components of a computer system 302 on which the system of the present disclosure can be implemented. The computer system 302 can include a storage device 304, computer software code 306, a network interface 308, a communications bus 310, a central processing unit (CPU) (microprocessor) 312, a random access memory (RAM) 314, and one or more input devices 316, such as a keyboard, mouse, etc. It is noted that the CPU 312 could also be one or more graphics processing units (GPUs). The server 302 could also include a display (e.g., liquid crystal display (LCD), cathode ray tube (CRT), etc.). The storage device 304 could comprise any suitable, computer-readable storage medium such as disk, non-volatile memory (e.g., read-only memory (ROM), erasable programmable ROM (EPROM), electrically-erasable programmable ROM (EEPROM), flash memory, field-programmable gate array (FPGA), etc.). The computer system 302 could be a networked computer system, a personal computer, a server, a smart phone, tablet computer etc. It is noted that the server 302 need not be a networked server, and indeed, could be a stand-alone computer system.

The functionality provided by the present disclosure could be provided by computer software code 306, which could be embodied as computer-readable program code stored on the storage device 304 and executed by the CPU 312 using any suitable, high or low level computing language, such as Python, Java, C, C++, C#, .NET, MATLAB, etc. The network interface 308 could include an Ethernet network interface device, a wireless network interface device, or any other suitable device which permits the server 302 to communicate via the network. The CPU 312 could include any suitable single-core or multiple-core microprocessor of any suitable architecture that is capable of implementing and running the computer software code 306 (e.g., Intel processor). The random access memory 314 could include any suitable, high-speed, random access memory typical of most modern computers, such as dynamic RAM (DRAM), etc.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A computer vision system for performing noisy contour alignment comprising:
    a memory; and
    a processor in communication with the memory, the processor:
        generating a loss function;
        training a neural network using the loss function and a a dataset including plurality of images to learn to align contours with progressively increasing complex forward and backward transforms over increasing scales; and
        aligning an attribute of an image of the dataset using the trained neural network.

2. The system of claim 1, wherein the processor determines an upper bound of the loss function.

3. The system of claim 1, wherein the loss function is a local shape-dependent Chamfer upper bound loss function that measures proximity and local shape similarity.

4. The system of claim 1, wherein the processor trains the neural network by:
    extracting features of a source and target image pair of the dataset at different scales,
    utilizing warp predictors to determine forward transforms to align source to target features at each scale, and
    applying the loss function to determine backward transforms to align target to source features at each scale.

5. The system of claim 1, wherein the neural network is a convolutional neural network.

6. The system of claim 1, wherein the dataset is a Modified National Institute of Standards and Technology (MNIST) digit image dataset or a geo-parcel to aerial image alignment dataset.

7. The system of claim 1, where the processor aligns a noisy digit contour present in the image or a parcel present in the image.

8. A method for performing noisy contour alignment by a computer vision system, comprising the steps of:
    generating a loss function;
    training a neural network using the loss function and a dataset including a plurality of images to learn to align noisy contours with progressively increasing complex forward and backward transforms over increasing scales; and
    aligning an attribute of an image of the dataset using the trained neural network.

9. The method of claim 8, further comprising the step of determining an upper bound of the loss function.

10. The method of claim 8, wherein the loss function is a local shape-dependent Chamfer upper bound loss function that measures proximity and local shape similarity.

11. The method of claim 8, further comprising the steps of training the neural network by
    extracting features of a source and target image pair of the dataset at different scales,
    utilizing warp predictors to determine forward transforms to align source to target features at each scale, and
    applying the loss function to determine backward transforms to align target to source features at each scale.

12. The method of claim 8, wherein the neural network is a convolutional neural network.

13. The method of claim 8, wherein the dataset is a Modified National Institute of Standards and Technology (MNIST) digit image dataset or a geo-parcel to aerial image alignment dataset.

14. The method of claim 8, further comprising the step of aligning the attribute of the image of the dataset by the trained neural network by aligning a noisy digit contour present in the image or a parcel present in the image.

15. A non-transitory computer readable medium having instructions stored thereon for performing noisy contour alignment by a computer vision system which, when executed by a processor, causes the processor to carry out the steps of:
    generating a loss function;
    training a neural network using the loss function and a a dataset including plurality of images to learn to align noisy contours with progressively increasing complex forward and backward transforms over increasing scales; and
    aligning an attribute of an image of the dataset using the trained neural network.

16. The non-transitory computer readable medium of claim 15, the processor further carrying out the step of determining an upper bound of the loss function.

17. The non-transitory computer readable medium of claim 15, wherein the loss function is a local shape-dependent Chamfer upper bound loss function that measures proximity and local shape similarity.

18. The non-transitory computer readable medium of claim 15, the processor further carrying out the step of training the neural network by:

extracting features of a source and target image pair of the dataset at different scales, utilizing warp predictors to determine forward transforms to align source to target features at each scale, and applying the loss function to determine backward transforms to align target to source features at each scale.

19. The non-transitory computer readable medium of claim 15, wherein the neural network is a convolutional neural network.

20. The non-transitory computer readable medium of claim 15, the processor further carrying out the step of aligning the attribute of the image of the dataset by the trained neural network by aligning a noisy digit contour present in the image or a parcel present in the image.

* * * * *

UNITED STATES PATENT AND TRADEMARK OFFICE
CERTIFICATE OF CORRECTION

Page 1 of 1

PATENT NO. : 11,610,322 B2
APPLICATION NO. : 17/104698
DATED : March 21, 2023
INVENTOR(S) : Veeravasarapu et al.

It is certified that error appears in the above-identified patent and that said Letters Patent is hereby corrected as shown below:

On the Title Page

On page 2, Item (56) under the References Cited Other Publications Column, the fifth reference down the first column, the name "Mexiadis, et al." should be deleted and replaced with the name "Alexiadis, et al."

On page 2, Item (56) under the References Cited Other Publications Column, the seventh reference down the second column, the name "Macken." should be deleted and replaced with the name "Nacken"

In the Claims

In Column 15, Line 51, Claim 1, the word "a" should be deleted and the word "a" should be inserted after the word "including"

In Column 16, Line 51, Claim 15, the third instance of the word "a" should be deleted and in Line 52, the word "a" should be inserted after the word "including"

Signed and Sealed this
Twenty-third Day of May, 2023

Katherine Kelly Vidal
*Director of the United States Patent and Trademark Office*